United States Patent
Shapiro et al.

(10) Patent No.: US 9,409,294 B1
(45) Date of Patent: Aug. 9, 2016

(54) HIERARCHICAL GEOMETRIC PLAN COMPOSITION (HGPC) FRAMEWORK FOR ROBOT TASK PLANNING

(71) Applicant: Toyota Motor Engineering & Manufacturing North America, Inc., Erlanger, KY (US)

(72) Inventors: Evan Shapiro, New Canaan, CT (US); Prasanna Velagapudi, Pittsburgh, PA (US); Aaron M. Blasdel, San Jose, CA (US)

(73) Assignee: Toyota Motor Engineering & Manufacturing North America, Inc., Elanger, KY (US)

( * ) Notice: Subject to any disclaimer, the term of this patent is extended or adjusted under 35 U.S.C. 154(b) by 0 days.

(21) Appl. No.: 14/639,838

(22) Filed: Mar. 5, 2015

(51) Int. Cl.
G05B 19/04 (2006.01)
G05B 19/18 (2006.01)
B25J 9/16 (2006.01)

(52) U.S. Cl.
CPC .............. *B25J 9/1664* (2013.01); *Y10S 901/02* (2013.01)

(58) Field of Classification Search
CPC ...... B25J 9/1664; B25J 9/1671; B25J 9/1602; B25J 9/1628
See application file for complete search history.

(56) References Cited

U.S. PATENT DOCUMENTS

| | | | |
|---|---|---|---|
| 5,774,632 A | 6/1998 | Kaske | |
| 5,841,959 A * | 11/1998 | Guiremand | B25J 9/1671 345/440 |
| 5,889,926 A | 3/1999 | Bourne et al. | |
| 6,353,814 B1 | 3/2002 | Weng | |
| 6,560,512 B1 * | 5/2003 | Rosen | B25J 9/1664 700/245 |
| 6,862,497 B2 | 3/2005 | Kemp et al. | |
| 7,370,022 B2 | 5/2008 | Gupta et al. | |
| 7,415,321 B2 | 8/2008 | Okazaki et al. | |
| 7,823,126 B2 | 10/2010 | Kim et al. | |
| 2012/0010772 A1 * | 1/2012 | Pack | B25J 9/1664 701/27 |
| 2012/0046983 A1 | 2/2012 | Nettleton et al. | |
| 2013/0218340 A1 * | 8/2013 | Hager | B25J 9/1671 700/257 |
| 2013/0343640 A1 * | 12/2013 | Buehler | B25J 9/0087 382/155 |
| 2015/0366157 A1 * | 12/2015 | Holmstrom | A01J 5/0175 119/651 |

OTHER PUBLICATIONS

Cambon et al.; "A Robot Task Planner that Merges Symbolic and Geometric Reasoning"; ECAI'2004, PAIS 2004, 5 pages; Aug. 22-27, 2014.
Wu, Xianghai; "Human-Inspired Robot Task Teaching and Learning"; Diss. University of Waterloo; 156 pages; 2009.

(Continued)

*Primary Examiner* — Nicholas Kiswanto
(74) *Attorney, Agent, or Firm* — Snell & Wilmer LLP

(57) ABSTRACT

A robot includes at least one actuator or motor and a processor configured to represent the task as a meta-node having a meta start space representing starting configurations and a meta end space representing ending configurations. The meta-node may be parallel including a first sub-node and a second sub-node each having a start space within the meta start space and an end space within the meta end space. The meta-node may also be a repetition meta-node including a third sub-node having a start space within the meta start space and an end space outside of the meta end space such that the meta end space is reached by multiple executions of the third sub-node. The processor may also simulate the task by executing the meta-node and instruct the actuator to actuate the portion of the robot based on the simulation.

20 Claims, 9 Drawing Sheets

(56) References Cited

OTHER PUBLICATIONS

Kaelbling et al; "Integrated robot task and motion planning in the now"; No. Mit-Csail-Tr-2012-018, Massachusetts Inst of Tech Cambridge Computer Science and Artificial Intelligence Lab; 69 pages; 2012.

Kadono et al.; "Context-constrained matching of hierarchical CAD-based models for outdoor scene interpretation." *Automated CAD-Based Vision, 1991., Workshop on Directions in*, IEEE, pp, 186-195; 1991.

Hutchinson et al.; "Spar: A planner that satisfies operational and geometric goals in uncertain environments." *AI magazine* 11.1; pp. 31-61; 1990.

Marzinotto et al.; "Towards a unified behavior trees framework for robot control," *Robotics and Automation (ICRA), 2014 IEEE international Conference on*. IEEE, 8 pages; 2014.

Fernández-Madrigal, Juan-Antonio, Cipriano Galindo, and Javier Gonzaález. "Assistive navigation of a robotic wheelchair using a multihierarchical model of the environment." *Integrated Computer-Aided Engineering* 11.4; pp. 309-322; 2004.

* cited by examiner

HIERARCHICAL GEOMETRIC PLAN COMPOSITION (HGPC) FRAMEWORK FOR ROBOT TASK PLANNING

BACKGROUND

1. Field

The present disclosure relates to robots and, more particularly, to a hierarchical framework for representing and planning tasks for robots.

2. Description of the Related Art

A robot typically includes moving parts, such as arms, wheels and end-effectors for performing motor functions, as well as a processor for planning the actions of the robot. Often, these robots perform long sequences of actions that begin in a start space and end in a goal space (i.e., to complete a desired task). It is preferable for the result of the long sequence of actions to be determined prior to the robot acting because certain later actions may not work as expected after a prior action has completed. The calculation of the long sequences of actions can be cumbersome and require extensive processing and memory capabilities. Each additional action to be performed between the start space and the goal space increases the complexity and processing and memory requirements for determining a trajectory from the start space to the goal space.

In order to attempt to reduce the complexity and the processing and memory requirements, some robot controllers split a long-trajectory task into multiple smaller tasks and treat each smaller task as a complete task. While this can reduce requirements of the controller, one of the smaller tasks between the start space and the goal space may provide undesirable results as a smaller task may end in a space from which it is impossible to reach the goal space because the planning only accounts for one of the smaller tasks at a time. Accordingly, use of these methods may increase the time and energy required to achieve the desired task as the robot may have to backtrack and attempt different smaller tasks to move towards the goal space.

Other robot controllers represent the intermediate tasks in the abstract so that the task may or may not be physically possible. The controller may use the outcomes of the abstract representations of the intermediate tasks to determine an approximation of the result of the combination of intermediate tasks in order to determine if the combination will result in the desired task being accomplished. Because the path from the start space to the goal space is represented by abstractions that may or may not be possible, the robot may still have to backtrack and start over from a previous intermediate task.

Thus, there is a need for a system for a hierarchal representation of intermediate tasks and combinations of the intermediate tasks so that accurate solutions to long horizon tasks can be simulated by a controller of a robot.

SUMMARY

What is described is a robot configured to accomplish a task in an environment. The robot includes at least one actuator or motor configured to actuate a portion of the robot. The robot also includes a processor coupled to the at least one actuator or motor. The processor is configured to represent the task as a meta-node having a meta start space representing starting configurations of the robot and the environment and a meta end space representing ending configurations of the robot and the environment after the task is completed. The meta-node may be a parallel meta-node including a first sub-node and a second sub-node each having a parallel start space within the meta start space and a parallel end space within the meta end. The meta end space is reached by successful execution of at least one of the first sub-node or the second sub-node. The meta-node may also be a repetition meta-node including a third sub-node having a repetition start space within the meta start space and a repetition end space outside of the meta end space. The meta end space is reached by multiple executions of the third sub-node. The processor may also perform a simulation of the task by executing the parallel meta-node or the repetition meta-node. The processor may also instruct the actuator to actuate the portion of the robot based on the simulation.

Also described is a method for controlling a robot. The method includes representing, by the processor, a task as a meta-node having a meta start space representing starting configurations of the robot and the environment and a meta end space representing ending configurations of the robot and the environment after the task is completed. The meta-node may be a parallel meta-node including a first sub-node and a second sub-node each having a parallel start space within the meta start space and a parallel end space within the meta end space. The meta end space is reached by successful execution of at least one of the first sub-node or the second sub-node. The meta-node may also be a repetition meta-node including a third sub-node having a repetition start space within the meta start space and a repetition end space outside of the meta end space. The meta end space is reached by multiple executions of the third sub-node. The meta-node may also be a sequence meta-node including a fourth sub-node having a first sequence start space in the meta start space and a first sequence stop space. The sequence meta-node may also include a fifth sub-node having a second sequence start space in the first sequence stop space of the fourth sub-node and a second sequence stop space in the meta stop space. The method may also include performing, by the processor, a simulation of the task by executing the parallel meta-node, the repetition meta-node or the sequence meta-node. The method may also include instructing, by the processor, the actuator to actuate the portion of the robot based on the simulation.

Another method for controlling a robot includes receiving, at a processor, a definition of a meta-node having a meta start space representing starting configurations of the robot and the environment and a meta end space representing ending configurations of the robot and the environment after the task is completed. The meta-node may be a parallel meta-node including a first sub-node and a second sub-node each having a parallel start space within the meta start space and a parallel end space within the meta end space. The meta end space is reached by successful execution of at least one of the first sub-node or the second sub-node. The meta-node may also be a repetition meta-node including a third sub-node having a repetition start space within the meta start space and a repetition end space outside of the meta end space. The meta end space is reached by multiple executions of the third sub-node. The method may also include performing, by the processor, a simulation of the task by executing the parallel meta-node or the repetition meta-node. The method may also include instructing, by the processor, the actuator to actuate the portion of the robot based on the simulation.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
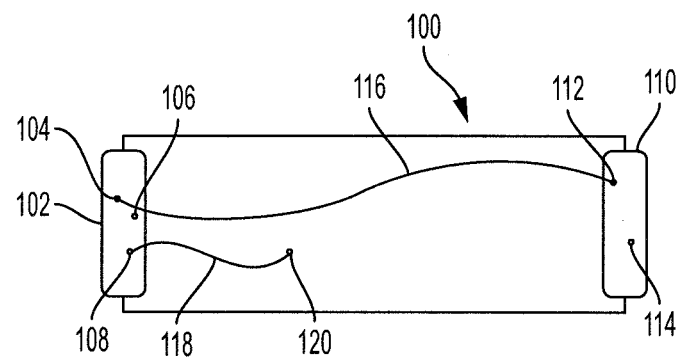
FIG. 1 illustrates a node having a start space and an end space according to an embodiment of the present invention.

The systems and methods described herein provide a framework for defining hierarchal representations of intermediate tasks of robots so that controllers of the robots can more efficiently plan and execute long-horizon tasks. The systems and methods provide several benefits and advantages such as the ability to represent intermediate tasks between a start space and an end space in a manner in which the representations accurately depict plans for tasks based on real world geometrical constraints. The ability to represent the intermediate tasks in an accurate manner provides benefits and advantages such as ensuring that the robot can simulate a long-horizon task prior to acting, thus reducing the necessity to backtrack. The systems and methods provide additional benefits and advantages such as the ability to combine each small and intermediate task into a hierarchy of nodes. Use of the hierarchy of nodes provides benefits and advantages such as further reducing the need for backtracking as multiple subtask solutions may be determined in parallel. Use of the hierarchy of nodes further provides benefits and advantages of efficient use of processing and memory as a plan for a long-horizon trajectory may be determined using nodes higher on the hierarchy, thus preventing the need to process each action individually during the simulation. Use of the hierarchy of nodes provides further benefits and advantages such as the capability to more quickly and efficiently search the entire structure of actions as the tasks are organized in the structure and thus their location is known.

An exemplary system includes a data structure that includes a plurality of nodes that each represent a task or a group of tasks to be performed by a robot. The nodes or "sub-nodes" may be combined into larger nodes called "meta-nodes" such that a single meta-node represents a combination of tasks that are each represented by the sub-nodes. The structure may include "sequence meta-nodes" which represent a collection of tasks which must be performed in a particular sequence to achieve a goal. The structure may also include "parallel meta-nodes" which represent a collection of alternate subtasks, only one of which must be performed to achieve a goal. The structure may also include "repetition meta-nodes" which represent a single task that must be recursively invoked in order to achieve a goal.

With regards to robot trajectories, a trajectory from a start space to a goal space may require a significant quantity of intermediate tasks within a free space. The free space includes all geometric constraints of the robot and its environment such as the joint angles of the robot, the poses of objects in the environment and discrete states of the robot after tasks are complete. When planning the trajectory, it is desirable to plan tasks that occur within the free space as a task whose outcome is outside of the free space is physically impossible and/or undesirable. The trajectory may be divided into a plurality of nodes that each includes an algorithm that can solve the path-finding problem from a start space defined by the node to an end space defined by the node.

With reference to FIG. 1, a node 100 may include a start space 102, an end space 110 and a trajectory 116 between the start space 102 and the end space 110. The start space 102, the end space 110 and the trajectory 116 are constructed so that each of them is contained within the free space. The spaces may be defined when the node 100 is designed or created and/or may be functions and change based on certain inputs. The start space 102 may include a start point 104, a start point 106 and a start point 108, each representing a point from which the algorithm may begin. The end space 110 may include an end point 112 and an end point 114, each representing a point at which the algorithm is complete. The start space 102 and the end space 110 may be known such that the node 100 can represent any algorithm that begins at the start space 102 and ends in the end space 110 and is possible given geometric constraints of the robot and the environment.

The node 100 may include a function that when executing the node 100, the processor is configured to receive or select an input (a start point), perform the function of the node 100 using the input and generate an output (an end point) based on the input and the function. In that regard, an input to the node 100 does not necessarily result in an output that is acceptable (i.e., the output is not within the end space 110). Accordingly, the processor may perform multiple iterations of the node 100 prior to reaching the end space 110.

A first iteration may include selecting a start point within the free space, such as the start point 108. The processor may then perform the function of the node 100 using the configuration of the robot and the environment represented by the start point 108 as input to generate a trajectory 118. The processor may determine whether the result of the function (i.e., the end point 120) is within the end space 110. If the processor determines that the result of the function is not within the end space 110 (which it is not), the processor may perform a second iteration that includes selecting the start point 104. The processor may then perform the function of the node 100 using the configuration of the robot and the environment represented by the start point 104 to generate the trajectory 116. The result of the function may be the end point 112. The processor may then determine that the end point 112 is within the end space 110 so that the start point 104, the trajectory 116 and the end point 112 represents a valid solution to the task of the node 100. In some embodiments, the processor may select a plurality of start points and simulate using each at the same time.

The node 100 can represent any trajectory between the start space 102 and the end space 110. In FIG. 1, the node 100 includes the trajectory 116. However, other trajectories may be used to achieve the goal (i.e., reach the end space 110 from the start space 102 while staying within the free space) of the node 100. Accordingly, the node 100 can be used in a simulation that includes multiple nodes without first determining the exact trajectory of the node 100. This provides several benefits and advantages such as allowing simulation of a long-horizon trajectory without intensive processing (i.e., there is no need to determine the exact trajectory between the start space and the end space during simulation of the long-horizon trajectory) and the ability to group nodes into larger nodes, or meta-nodes.

The processor may select trajectories to explore randomly, based on probabilities and/or based on other algorithms such as Bayesian Interference or the like. Furthermore, the processor may select trajectories to explore based on an order of completion of each trajectory, whether the start and/or end location of each trajectory aligns with a prior and/or a future node's end and/or start locations or the like.

When used within a meta-node, the node 100 may be referred to as a sub-node. The meta-nodes can be used to represent a collection of nodes that may be combined to reach a goal space from a start space.

As each node represents a function, the function can be simulated by a processor of the robot. Execution of any node may refer to performing a simulation of the node using a selected input (i.e., a start point). When the node 100 is executed, the processor of the robot may select a start point, such as the start point 108 and perform the simulation of the function of the node using the start point. If the result (end point) of the simulation is not within the goal space (end space), then the processor may continue to select new input points and perform the simulation until a result ending in the end space is found. The node may then output the start point, the trajectory and/or the end point.

Figure 2:
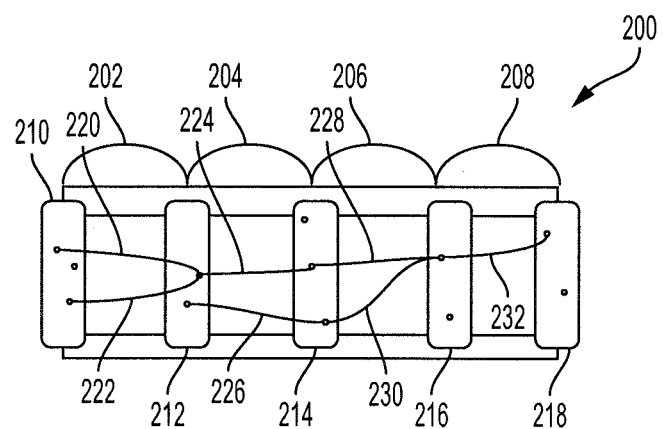
FIG. 2 illustrates a sequence meta-node having four sequence sub-nodes according to an embodiment of the present invention.

With reference now to FIG. 2, a sequence meta-node 200 may include a meta start space 210 and a meta end space 218. The sequence meta-node 200 may include a first sub-node 202, a second sub-node 204, a third sub-node 206 and a fourth sub-node 208 in an ordered sequence. The first sub-node 202, the second sub-node 204, the third sub-node 206 and/or the fourth sub-node 208 may be referred to as "sub-nodes" because they are lower in the hierarchy than the sequence meta-node 200 (i.e., contained within the sequence meta-node 200).

The first sub-node 202 may begin at the meta start space 210 of the sequence meta-node 200 and end at an intermediate end space 212 (i.e., a first sequence end space with respect to the first sub-node 202). The second sub-node 204 may begin at the intermediate end space 212 (i.e., a second sequence start space with respect to the second sub-node 204) of the first sub-node 202 and end at an intermediate end space 214. In that regard, the intermediate end space 212 may be a space which can be achieved by a simulation of the first sub-node 202 using starting points in the meta start space 210 as well as including points that may be used as starting points for the second sub-node 204.

The third sub-node 206 may begin at the intermediate end space 214 of the second sub-node 204 and end at an intermediate end space 216. The fourth sub-node 208 may begin at the intermediate end space 216 of the third sub-node 206 and end at the meta end space 218 of the sequence meta-node 200.

FIG. 2 illustrates how multiple nodes may be combined into a meta-node. Because the start space and end space of each node within the sequence meta-node 200 is known, the sequence meta-node 200 may accurately represent an entire trajectory from the meta start space 210 to the meta end space 218. Accordingly, the sequence meta-node 200 may be combined with other nodes and/or meta-nodes in order to simulate a longer-horizon trajectory such that the sequence meta-node 200 is only one of a collection of meta-nodes used to simulate a longer-horizon trajectory.

Once a robot (e.g., the processor of the robot) is ready to start planning the specific trajectories of each node between the start space and the end space of a long-horizon trajectory, the processor can run the simulation by executing the meta-node. During execution, each meta-node can either directly run motion planning algorithms on their space (i.e., between their start space and end space) or delegate the computation to the individual nodes. Delegation of the computation provides the benefit and advantage of allowing efficient selection of intermediate goals in order to bias a search towards paths that are more likely to contain solutions within the free space.

When the specific trajectory of the sequence meta-node 200 is to be determined, the sequence meta-node 200 may delegate the processing to the first sub-node 202, the second sub-node 204, the third sub-node 206 and the fourth sub-node 208. Each sub-node can compute trajectories at the same time as they each know their starting and ending spaces, but it is not necessary for them to do so. Accordingly, the first sub-node 202 may determine that a trajectory 220 and a trajectory 222 can both achieve its goal; the second sub-node 204 may determine that a trajectory 224 and a trajectory 226 can both achieve its goal; the third sub-node 206 may determine that a trajectory 228 and a trajectory 230 can achieve its goal; and the fourth sub-node 208 may determine that a trajectory 232 can achieve its goal.

As with the node 100, the processor may select a start point(s) in the meta start space 210. The processor may then cause the function of the sequence meta-node 200 to operate using the selected start point(s) and determine whether the end point of the function is within the meta end space 218. If the end point is not within the meta end space 218, the processor may repeat these steps until a solution is found.

In some embodiments, the processor may iteratively select start points of each of the sub-nodes, execute their functions and determine whether the outputs are within the end space of the sub-node. In some embodiments, the processor may cause all sub-nodes to execute at the same time or may first run the first sub-node 202 then the second sub-node 204, etc.

Each node may return trajectories to the sequence meta-node 200 for processing and joining of each trajectory before execution. The sequence meta-node 200 may search for a set of trajectories to combine in which the beginning of each successor trajectory matches the end of the predecessor trajectory so that all trajectories can be connected. The sequence meta-node 200 may output a collection of trajectories that accomplishes the goal, such as the combination including the trajectory 220, the trajectory 224, the trajectory 228 and the trajectory 232 and/or may execute the combination of trajectories. In some embodiments, each node may execute its determined trajectory prior to or instead of returning the trajectory to the sequence meta-node 200.

Consider as an example that a robot has a task of moving a glass from a table to a bin. This may be represented as a sequence meta-node having a start space of the original position of the robot and the glass in the bin and an end space of the glass in the bin. The sequence meta-node may include a first sub-node having the same start space of the sequence meta-node and an intermediate end space of the glass being grasped by the robot. The sequence meta-node may also include a second sub-node having an intermediate start space of the glass being grasped by the robot and an intermediate end space of the robot grasping the glass and being near the bin. The sequence meta-node may also include a third sub-node having an intermediate start space of the robot grasping the glass and being near the bin and an end space that is the same as the end space of the sequence meta-node. The goals of the first, second and third sub-node may each be accomplished in a variety of manners, but because the start spaces and end spaces are known, the entire trajectory may be represented by the sequence meta-node.

Moving forward, in some situations, multiple solutions to a single problem may exist. Determination of one of the solutions is sufficient in order to achieve the goal, but some of the solutions may be preferable to others so it may be desirable for the robot to be able to determine each solution so that the ideal solution can be selected. In order to determine the ideal solution, each solution may be treated as a node, and the collection of nodes may be referred to as a parallel meta-node. This approach allows each solution to be considered by the processor of the robot.

Figure 3:
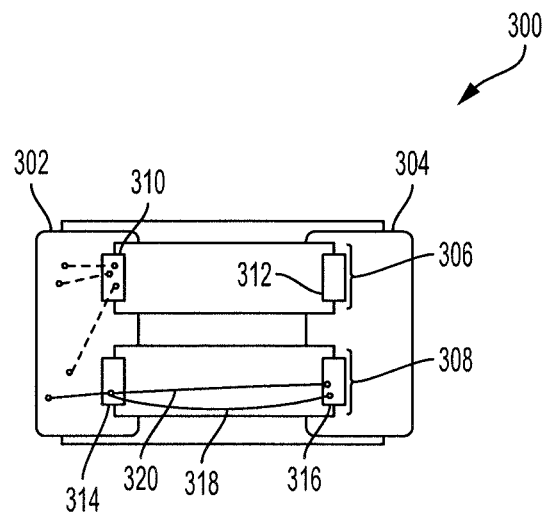
FIG. 3 illustrates a parallel meta-node having two parallel sub-nodes according to an embodiment of the present invention.

With reference now to FIG. 3, a parallel meta-node 300 includes a meta start space 302 and an meta end space 304. The parallel meta-node 300 further includes a first sub-node 306 and a second sub-node 308. The first sub-node 306 has a parallel start space 310 within the meta start space 302 of the parallel meta-node 300 and a parallel end space 312 within the meta end space 304 of the parallel meta-node 300. The second sub-node 308 similarly has a parallel start space 314 within the meta start space 302 and a parallel end space 316 within the meta end space 304 of the parallel meta-node 300. The first sub-node 306 and the second sub-node 308 may represent different tasks that cause the robot to move from the meta start space 302 to the meta end space 304 while remaining within the free space. The first sub-node 306 and the second sub-node 308 of the parallel meta-node 300 may be unordered, alternate subtasks such that completion of one of the first sub-node 306 or the second sub-node 308 is sufficient to achieve the goal of the parallel meta-node 300. In other words, the meta end space 304 can be reached by successful execution of the first sub-node 306 or the second sub-node 308.

Use of the parallel meta-node 300 allows a processor of the robot to perform simulations while considering alternate trajectories for completing tasks by executing the parallel meta-node 300. During execution of the parallel meta-node 300, the processor may simulate one or both of the first sub-node 306 or the second sub-node 308. In the example illustrated in FIG. 3, the processor may determine a first trajectory 318 and a second trajectory 320 of the second sub-node 308. Accordingly, the parallel meta-node 300 may output one of the first trajectory 318 or the second trajectory 320.

As with the node 100, the processor may select a start point(s) in the meta start space 302. The processor may then cause the function of the parallel meta-node 300 to operate using the selected start point(s) and determine whether the end point of the function is within the meta end space 304. If the end point is not within the meta end space 304, the processor may repeat these steps until a solution is found.

In some embodiments, the processor may select a start point within either the parallel start space 310 or the parallel start space 314 and perform the simulation using one start point at a time. In some embodiments, the processor may select multiple start points from one or both of the first sub-node 306 or the second sub-node 308.

As an example, a goal may be for a robot to grasp a glass. However, multiple glasses may exist in the area surrounding the robot, meaning that the robot may grasp any of the glasses in order to complete the goal. Different sub-tasks, each associated with picking up one of the glasses, may be assigned to a node and the collection of nodes may be represented by a single parallel meta-node. Thus, the parallel meta-node represents a meta-task having a start space in which all of the glasses are on the table and an end space in which one of the glasses is being grasped by the robot.

Moving forward, in some situations, a goal may not be achievable until a single sub-task is performed several times. The solution to the goal may be represented by a repetition meta-node that includes a sub-node (i.e., the sub-task to be repeated) that is invoked or executed multiple times. The use of a repetition meta-node allows the node to be recursively invoked until the goal is satisfied so that operations may be repeated until another task is possible.

Figure 4:
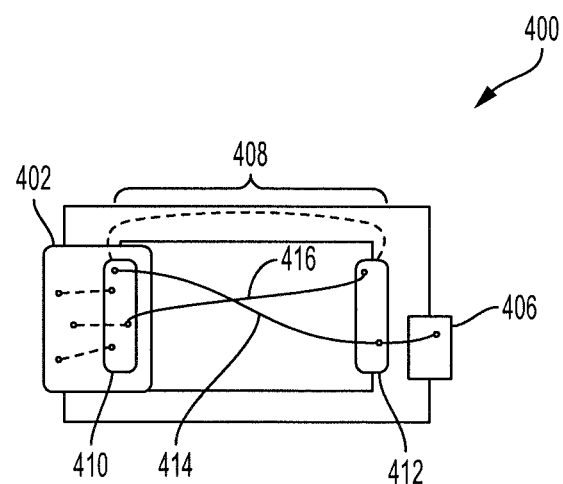
FIG. 4 illustrates a repetition meta-node having a repetition sub-node according to an embodiment of the present invention.

With reference now to FIG. 4, a repetition meta-node 400 may include a meta start space 402, an meta end space 406 and a sub-node 408. The meta end space 406 may be obtainable by multiple iterations of the sub-node 408. Accordingly, the sub-node 408 may include a repetition start space 410 that is within the meta start space 402 of the repetition meta-node 400 and an repetition end space 412 that is not within the meta end space 406 of the repetition meta-node 400. The repetition meta-node 400 thus represents multiple executions of the sub-node 408 beginning in the meta start space 402 and ending in the repetition end space 412. After a sufficient number of executions of the sub-node 408, the sub-node 408 may reach the meta end space 406.

When the processor of the robot begins to solve the repetition meta-node 400, the repetition meta-node 400 may repeatedly invoke the sub-node 408 until the meta end space 406 is reached. For example, the repetition meta-node 400 may invoke the sub-node 408 such that the sub-node 408 may find a first trajectory 414 from the repetition start space 410 to the repetition end space 412. The repetition meta-node 400 may then determine that the meta end space 406 has not yet been reached and execute the sub-node 408 again. The sub-node 408 may then find a second trajectory 416 from the repetition start space 410 to the repetition end space 412. The second trajectory 416 may result in the meta end space 406 of the repetition meta-node 400 being reached. The repetition meta-node 400 may determine that the meta end space 406 has been reached and output and/or execute the combination of the first trajectory 414 and the second trajectory 416.

In some embodiments, after a predetermined number of repetitions, the processor may select a new start point in the meta start space 402 and execute the function of the sub-node 408 another predetermined number of times to determine if the meta end space 406 is reached.

As an example, a meta-task may be for a robot to manipulate a particular object, such as a sandwich, from a refrigerator. However, the sandwich may be positioned behind, with respect to the refrigerator door, a number of objects such as cans, cartons or the like. A sub-node may be defined as a sub-task of removing an item from the refrigerator with a start space of items in the refrigerator and an end space of one less item being in the refrigerator. A repetition meta-node may be defined with a start space of all of the items in the refrigerator and an end space of the sandwich being reachable or removed. The repetition meta-node may invoke the sub-node multiple times until the end space is reached.

Figure 5:
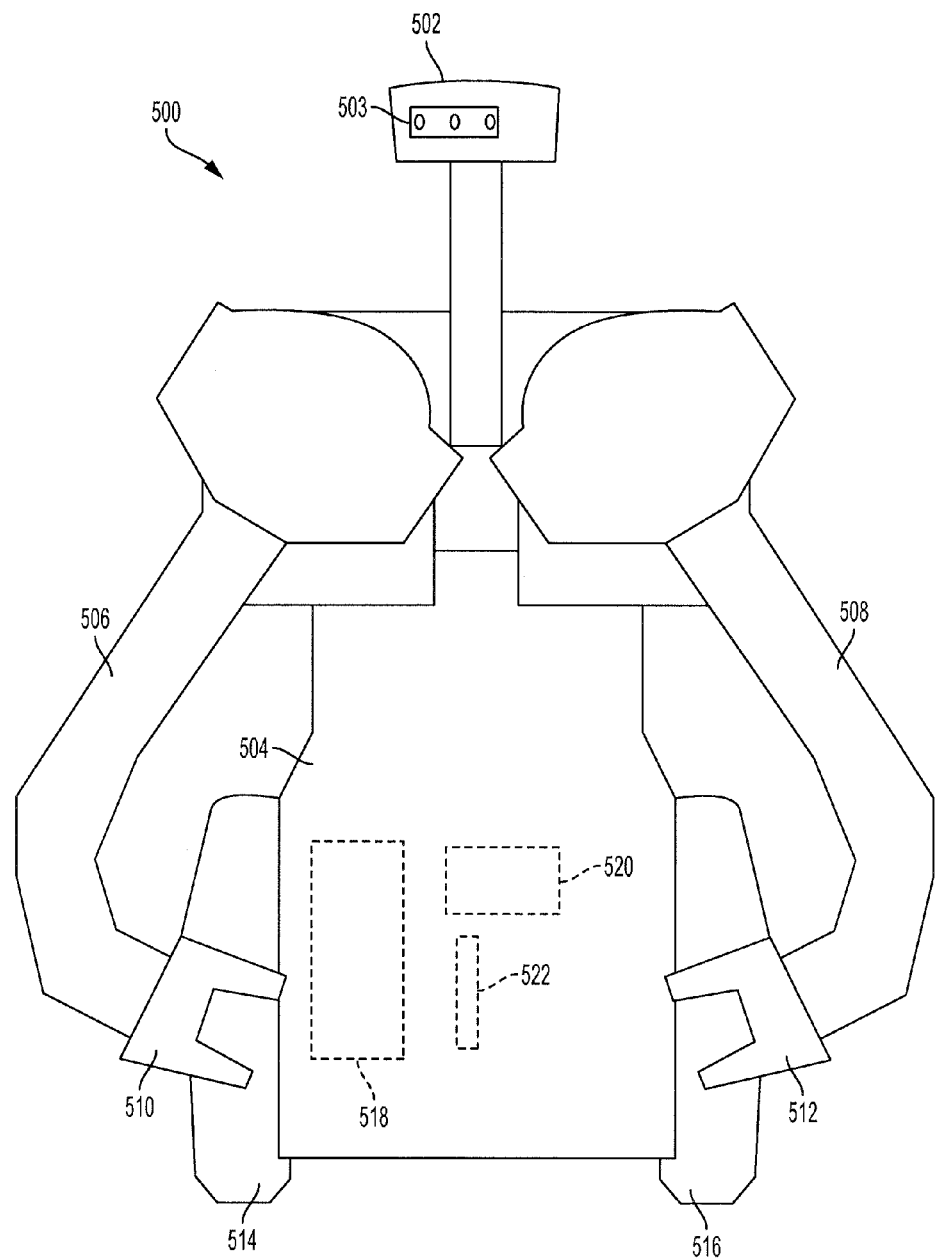
FIG. 5 illustrates a robot for performing a task according to an embodiment of the present invention.

With reference now to FIG. 5, a robot 500 may include a head 502, a body 504 left arm 506, a right arm 508, a left end-effector 510, a right end-effector 512, a left wheel 514 and a right wheel 516. In some embodiments, a robot may include any combination of the above parts and/or additional parts and remain within the scope of the invention.

The head 502 of the robot 500 may include sensors 503 capable of detecting data in the surrounding environment of the robot 500. The sensors may include one or more of: a camera, another light sensor, an infrared sensor, a microphone, an IMU, a GPS or the like. The head 502 may be capable of changing position relative to the body 504 such that the sensors 503 may detect data in different directions relative to the body 504.

The body 504 may be coupled electrically and/or mechanically to the head 502, the left arm 506, the right arm 508, the left end-effector 510, the right end-effector 512, the left wheel 514 and the right wheel 516 such that all components may operate as a single unit. The body may include a battery 518, a processor 520 and a memory 522. The battery 518 may store electrical charge and be coupled to devices of the robot 500 in a manner in which the devices can receive electrical power from the battery 518. The battery 518 may be configured to be recharged via wireless charging, wired charging or a combination of wireless and wired charging.

The processor 520 may be one or any combination of a computer processor such as an ARM processor, DSP processor, an ASIC, an FPGA, a distributed processor or other form of processor or controller. The processor 520 may be positioned on the robot 500, may be a remote processor or it may be a pairing of a local and a remote processor. The processor 520 may be capable of determining feedback based on data detected by the sensors 503 and use the feedback to control the robot 500 such as controlling the position and movement of the head 502, the left arm 506, the right arm 508, the left end-effector 510, the right end-effector 512, the left wheel 514 and the right wheel 516.

The memory 522 may be one or any combination of the following: a RAM or other volatile or nonvolatile memory, a non-transitory memory or a data storage device, such as a hard disk drive, a solid state disk drive, a hybrid disk drive or other appropriate data storage. The memory 522 may further store machine-readable instructions which may be loaded into the memory 522 and executed by the processor 520. As with the processor 520, the memory 522 may be positioned on the robot 500, may be positioned remote from the robot 500 or may be a pairing of a local and a remote memory.

The left arm 506 and the right arm 508 may be capable of moving in one or more directions relative to the body 504. The left arm 506 and the right arm 508 may include or be coupled to motors and/or actuators capable of causing the left arm 506 and the right arm 508 to move and may include one or more joints such that the portions separated by joints may move relative to each other.

The left arm 506 and the right arm 508 may be coupled to a left end-effector 510 and a right end-effector 512, respectively, such that the location of the left end-effector 510 and the right end-effector 512 can be changed based on movement of the left arm 506 and the right arm 508. The left end-effector 510 and the right end-effector 512 may include or be coupled to motors and/or actuators such that they may be capable of manipulating objects in a manner such as grasping, pinching, pushing or the like.

The left wheel 514 and the right wheel 516 may include or be coupled to motors and/or actuators capable of exerting a torque on the left wheel 514 and the right wheel 516. When sufficient torque is exerted on the left wheel 514 and the right wheel 516, the wheels may rotate causing the robot 500 to move relative to a floor or a ground surface.

The processor 520 of the robot 500 may be capable of planning and executing tasks ranging from simple tasks, such as waving hello, to long-horizon complex tasks such as cleaning a room, traveling to a new location through closed doors or the like. The tasks may include multiple subtasks to be completed in a particular order, as alternatives and/or repetitively such that at least some of the subtasks may be organized as sequence meta-nodes, parallel meta-nodes and/or repetition meta-nodes. The tasks may be represented as one or more meta-nodes. In some embodiments, either the robot 500 or a user may define the meta-nodes and/or subnodes.

After the nodes have been defined, the processor 520 may simulate the task using the sub-nodes and meta-nodes. The task may be simulated by executing the plurality of meta-nodes. In some embodiments, not all meta-nodes are executed at the same time. For example, the processor 520 may execute one or more meta-nodes (but fewer than all meta-nodes) which in turn execute one or more sub-nodes within the executed meta-nodes. This causes a trajectory for the executed meta-nodes to be determined so that the processor 520 has a plan for the executed portion of the task. The processor 520 may then continue to execute the remaining meta-nodes using start and end points that result from the executed meta-nodes until the entire task has been successfully simulated.

In some embodiments, the meta-nodes may all be executed in parallel. For example, the processor 520 may execute all meta-nodes at once which, in turn, cause one or more sub-nodes within the meta-nodes to be executed. This results in faster planning as multiple independent parts of the trajectory can be computed at the same time. The processor 520 can then concatenate the separate trajectories to obtain a solution for its part of the task. Once the processor 520 has determined the solution, the processor 520 may instruct one or more of the actuators or motors to actuate based on the results of the simulation so that the robot 500 performs the task.

Figure 6A:
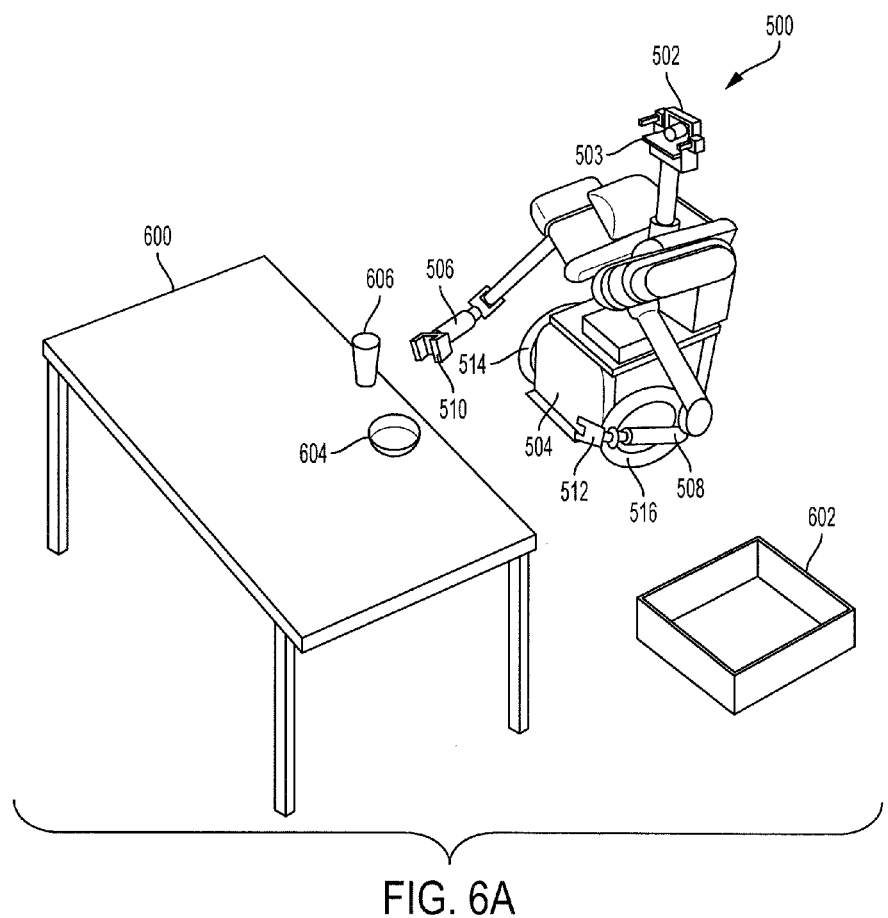
FIG. 6A illustrates the robot of FIG. 5 near a table and a bin and having a task of moving items from the table to the bin according to an embodiment of the present invention.

With reference now to FIG. 6A, the robot 500 may be in an area having a table 600 and a bin 602. The table 600 can be supporting a bowl 604 and a glass 606 that is nearer the robot 500 than the bowl 604. The robot 500 may have an exemplary goal of moving both the bowl 604 and the glass 606 from the table 600 to the bin 602.

Figure 6B:
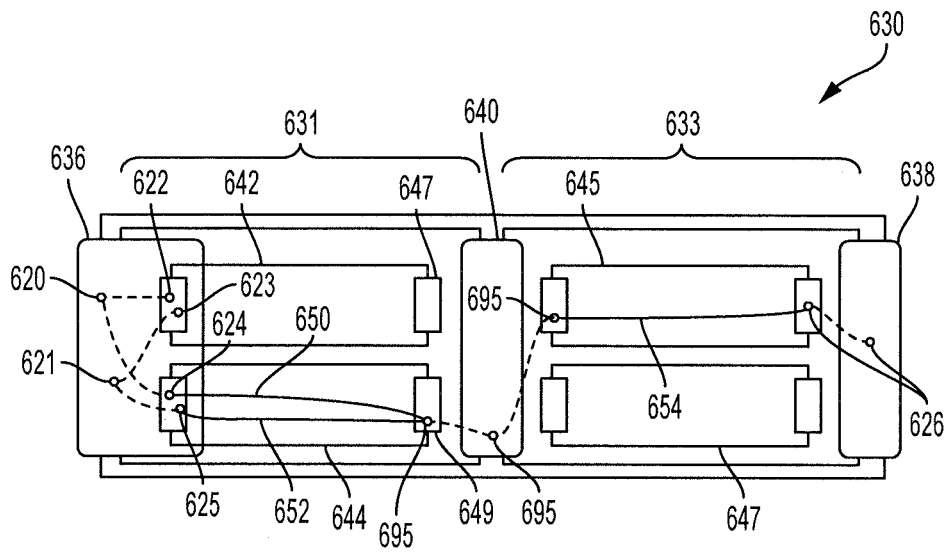
FIG. 6B illustrates a sequence meta-node having two parallel meta-nodes according to an embodiment of the present invention.

With reference now to FIGS. 6A and 6B, the goal involves the robot 500 transitioning from a meta start space 636 including the bowl 604 and the glass 606 being on the table 600 to a meta end space 638 including the bowl 604 and the glass 606 being in the bin 602. The processor 520 of the robot 500 may be capable of organizing, simulating and implementing the separate tasks using the hierarchy of nodes described herein such that the goal can be achieved in an efficient manner.

Figure 6C:
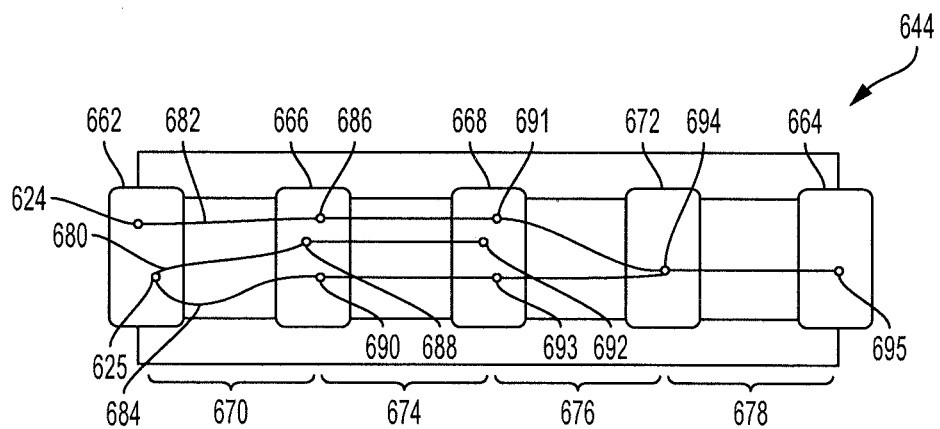
FIG. 6C illustrates a sequence meta-node for clearing the table, the sequence meta-node being a sub-node of one of the parallel meta-nodes of FIG. 6B according to an embodiment of the present invention.

With reference now to FIGS. 6A and 6C, a sequence meta-node GlassToBin node 644 represents a task of moving the glass 606 to the bin 602. The GlassToBin node 644 begins with a start space 662 (a meta start space) in which the glass 606 is on the table 600 and the robot 500 is not in contact with the glass 606. A PlanHandToSampledPoses node 670 (a sub-node to the GlassToBin node 644) represents a task of sampling poses of the robot 500 in which the left end-effector 510 or the right end-effector 512 is positioned near the glass 606. The PlanHandToSampledPoses node 670 may internally delegate computation to a sub-node of the PlanHandToSampled- Poses node 670 (making it a sub-sub node with respect to the GlassToBin node 644) that delegates computation to a node which performs motion planning.

A MoveHandTo node 674 (a sub-node to the GlassToBin node 644) may move fingers of the left end-effector 510 or the right end-effector 512 in order to grasp the glass 606. A PlanHandToSampledPoses node 676 (a sub-node to the GlassToBin node 644) operates similarly to the PlanHandToSampledPoses node 670 except that it represents a task of sampling poses in which the left end-effector 510 or the right end-effector 512 is positioned in or above the bin 602. A MoveHandTo node 678 (a sub-node to the GlassToBin node 644) operates similarly to the MoveHandTo node 674 except that it moves the fingers in order to release the glass 606.

Because each of the sub-nodes of the GlassToBin node 644 must be performed in order to achieve the goal and each node must be performed to achieve the goal, the GlassToBin node 644 is considered a sequence meta-node.

With reference now to FIGS. 6A and 6B, after the GlassToBin node 644 is completed, the remaining action is to move the bowl 604 to the bin 602. This action is represented by a BowlToBin node 645. The BowlToBin node 645 is a sequence meta-node that includes similar sub-nodes as the GlassToBin node 644 and thus will not be described.

Because it is also possible to achieve the goal of moving the glass 606 and the bowl 604 to the bin 602 by moving the bowl 604 first, a sequence meta-node BowlToBin node 642 is also defined. Similarly, because the glass 606 can be moved last, a sequence meta-node GlassToBin node 647 is defined. The BowlToBin node 642 and the GlassToBin node 647 include similar sub-nodes as the GlassToBin node 644, so these nodes will not be described in detail.

Because only one of the glass 606 or the bowl 604 can be moved at a time and either can be moved first, a parallel meta-node ItemToBin node 631 may represent a task beginning from the meta start space 636 (a meta start space of the ItemToBin node 631) with the glass 606 and the bowl 604 on the table 600 and ending at an intermediate end space 640 (which is a meta end space of the ItemToBin node 631) wherein one of the bowl 604 or the glass 606 are in the bin 602. The parallel meta-node ItemToBin node 631 may include both of the BowlToBin node 642 and the GlassToBin node 644 as either item may be placed in the bin 602 first.

The ItemToBin node 631 results in the intermediate end space 640. However, another node is required to reach the meta end space 638 as one of the two items is still on the table 600 in the intermediate end space 640. Accordingly, a second parallel meta-node ItemToBin node 633 represents the task beginning from the intermediate end space 640 (which is a meta start space with respect to the ItemToBin node 633) and resulting in the meta end space 638 (which is a meta end space with respect to the ItemToBin node 633) in which both items are in the bin 602. The ItemToBin node 633 may be similar to the ItemToBin node 631 as the ItemToBin node 633, like the ItemToBin node 631, has two available nodes (BowlToBin node 645 and GlassToBin node 647) for achieving a single task of moving one of the bowl 604 or the glass 606 from the table 600 to the bin 602.

It may be desirable to represent the entire task of moving the bowl 604 and the glass 606 to the bin 602 as a single node. Accordingly, a sequence meta-node 630 may be defined as including the ItemToBin node 631 and the ItemToBin node 633 such that the sequence meta-node 630 represents the entire task of moving the bowl 604 and the glass 606 to the bin 602. The sequence meta-node 630 begins at the meta start space 636 (a meta end space with respect to the sequence meta-node 630) and ends at the meta end space 638 (a meta end space with respect to the sequence meta-node 630). With respect to the sequence meta-node 630, the ItemToBin node 631 is a first sub-node such that the intermediate end space 640 is a sequence end space and the ItemToBin node 631 is a second sub-node. Similarly, with respect to the sequence meta-node 630, the BowlToBin node 642, the GlassToBin node 644, the BowlToBin node 645 and the GlassToBin node 647 are sub-sub-nodes and, similarly, the sequence meta-node is a meta-meta-node.

In order to plan, simulate or execute the sequence meta-node 630, the processor 520 selects a first start configuration 620 and a second start configuration 621. The first start configuration 620 and the second start configuration 621 each begin with the bowl 604 and the glass 606 being on the table 600, so the first start configuration 620 and the second start configuration 621 are each sent to the BowlToBin node 642 as a point 622 and a point 623 and the GlassToBin node 644 as a point 624 and a point 625.

With reference again to FIG. 6C, the results of a simulation are illustrated including how the end space 664 of the GlassToBin node 644 is achieved beginning with the point 624 and the point 625. The PlanHandToSampledPoses node 670 is executed three times, resulting in a first end point 686, a second end point 688 and a third end point 690 in the intermediate end space 666 (which may be referred to as a sequence end space) which are reached by trajectory 680, trajectory 682 and trajectory 684, respectively.

The MoveHandTo node 674 may use the first end point 686 and the second end point 688 simulated by the PlanHandToSampledPoses node 670 as beginning points to achieve grasps illustrated as end point 691, end point 692 and end point 693 within the intermediate end space 668.

The PlanHandToSampledPoses node 676 may use the end point 691 and the end point 693 as beginning points to reach the end point 694 within the intermediate end space 672.

The MoveHandTo node 678 may use the end point 694 as a starting point in its operation to reach the end point 695 in the end space 664. The end point 695 may then be output by the GlassToBin node 644 so that other meta-nodes can perform simulations knowing the end point 695.

With reference now to FIGS. 6A, 6B and 6C, the entire trajectory of the GlassToBin node 644 may be represented by the trajectory 650 and the trajectory 652. The end point 695 may be received by the ItemToBin node 633 and used as a starting point. The ItemToBin node 633 may determine which input configurations (starting points) are available in the free space. Because GlassToBin node 647 can only accept starting points in which the glass 606 is on the table, the BowlToBin node 645 must be used to reach the meta end space 638 from the intermediate end space 640.

Utilizing similar nodes as the GlassToBin node 644, the BowlToBin node 645 may achieve an end point 626 within the meta end space 638 via a trajectory 654. The end point 626 and the trajectories for reaching the end point 626 may be shared with the ItemToBin node 633 and the sequence meta-node 630 as they represent a plan for completing the entire task of moving the bowl 604 and the glass 606 to the bin 602.

With reference now to FIG. 7A, the robot 500 may again be in the same space with the table 600 and the bin 602. The table 600 now includes a first glass 700, a second glass 702, a third glass 704, a first bowl 706 and a second bowl 708. The robot 500 may be tasked with moving all of the items from the table 600 to the bin 602.

Figure 7A:
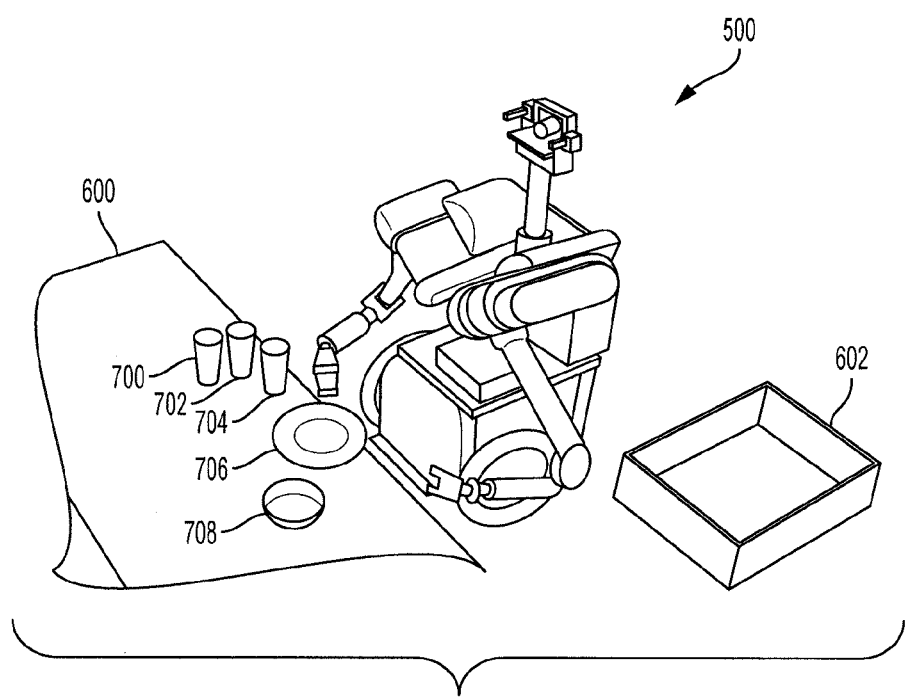
FIG. 7A illustrates the robot of FIG. 5 by the table and the bin and having a task of moving items from the table to the bin according to an embodiment of the present invention.
Figure 7B:
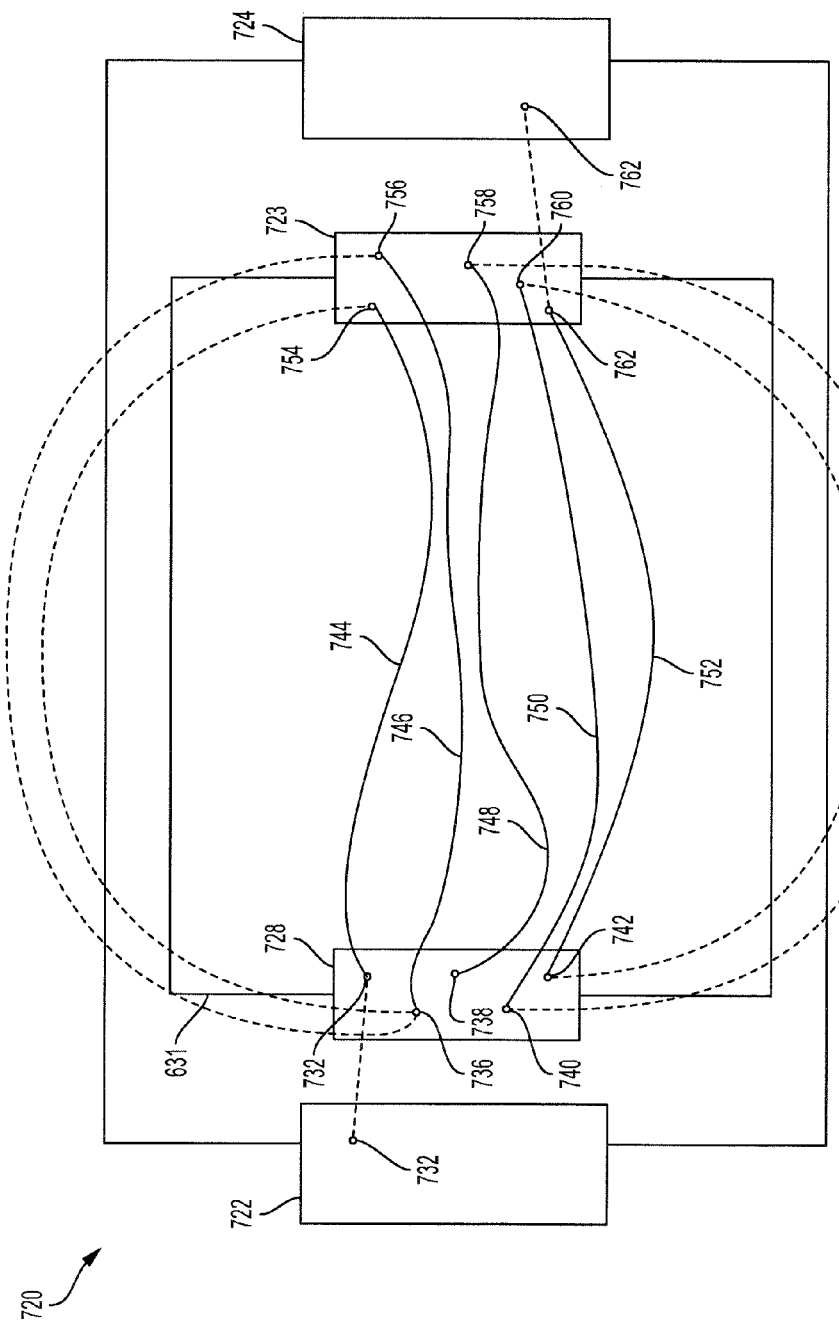
FIG. 7B illustrates a repetition meta-node for clearing the table according to an embodiment of the present invention.

With brief reference to FIGS. 7A and 6B, the processor 520 may represent movement of any of the items from the table 600 to the bin 602. Turning now to FIGS. 7A and 7B, the processor 520 may define the entire task of moving all of the items from the table 600 to the bin 602 as a repetitive meta-node (ClearTable node 720) having a meta start space 722 in which all of the items are on the table 600 and a meta end space 724 in which all of the items are in the bin 602. The ClearTable node 720 may recursively invoke the ItemToBin node 631 until all of the items are in the bin 602.

The ItemToBin node 631 may include a repetition start space 728 in which at least one object is on the table 600 and a repetition end space 723 in which one object has been moved from the table 600 to the bin. The ClearTable node 720 may receive or generate a starting point 732 and the ItemToBin node 631 may begin with the starting point 732. After the first iteration of the ItemToBin node 631, a goal 754 may be reached via a trajectory 744. At this point, the ClearTable node 720 may determine that the meta end space 724 has not been reached and that the ItemToBin node 631 should perform another iteration.

The ItemToBin node 631 may then perform a second iteration that begins at a starting point 736 and reaches a goal 756 via a trajectory 746. Again, the ClearTable node 720 may determine that the meta end space 724 has not been reached. The ItemToBin node 631 may then perform a third iteration that begins at a starting point 738 and reaches a goal 758 via a trajectory 748. This process may repeat until the end point 762, which is in the meta end space 724, has been reached. When the end point 760 has been reached, the ClearTable node 720 may indicate that the end point 762 and/or each of the trajectories correspond to completion of the ClearTable node 720.

Figure 8:
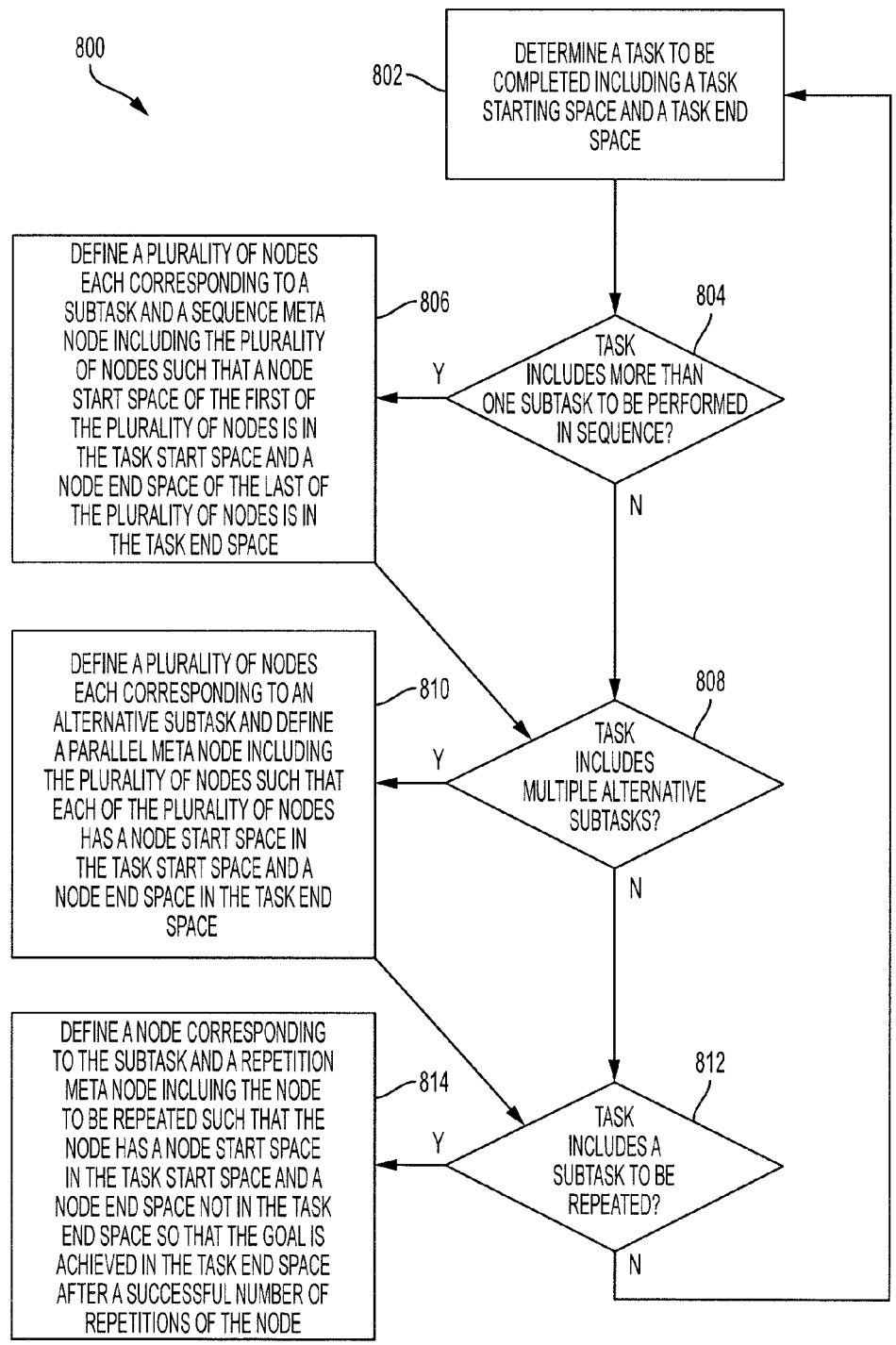
FIG. 8 illustrates a method for organizing a task into nodes according to an embodiment of the present invention.

FIG. 8 illustrates a method 800 to be performed for organizing a task into nodes. The method 800 begins at block 802 in which the processor determines a task to be completed. The task may be any task including long-horizon tasks. The task includes a start space and an end space within the free space.

In some embodiments, the method 800 may be performed by robot such that the processor of the robot may organize the tasks into nodes (including meta-nodes and sub-nodes). In some embodiments, the method 800 may be performed by a user of the robot such that the user organizes the tasks into nodes and then provides the definitions of the nodes to the processor of the robot. In these embodiments, the tasks are still represented as nodes within the processor so that the processor can simulate the task by executing the nodes.

In block 804, the processor determines whether a task or subtask includes more than one subtask. The subtasks referred to in this block are ordered subtasks such that a second subtask cannot be completed until a first subtask and a third subtask cannot be completed until the second subtask, etc.

In block 806, a plurality of sub-nodes is defined by the processor such that each of the sub-nodes corresponds to one of the subtasks. The processor may then define a sequence meta-node that includes each of the sub-nodes in order. Because the sub-nodes are ordered, a start space of the first sub-node is within the start space of the sequence meta-node and the end space of the last node is within the end space of the sequence meta-node.

In block 808, the processor determines whether a task or subtask can be solved by more than one alternative subtask. For example, the task may be solved in a number of different ways and is only required to be solved by one subtask.

In block 810, a plurality of sub-nodes is defined by the processor such that each of the sub-nodes corresponds to one of the alternative subtasks. The processor may then define a parallel meta-node that includes the sub-nodes such that the start space of each sub-node is within the start space of the parallel meta-node and the end space of each sub-node is within the end space of the parallel meta-node.

In block 812, the processor determines whether a task or subtask must be completed by repeating a single subtask multiple times. As an example, the task may be to place a nail into a wall. In order to achieve the task, the nail must be hammered multiple times.

In block 814, a sub-node is defined by the processor such that the sub-node corresponds to the subtask to be repeated. The processor may define a repetition meta-node that includes the sub-node such that the sub-node has a start space in the repetition meta-node start space and an end space in the repetition meta-node end space. The end space of the sequence meta-node will be accomplished after a number of successful iterations of the sub-node.

Figure 9:
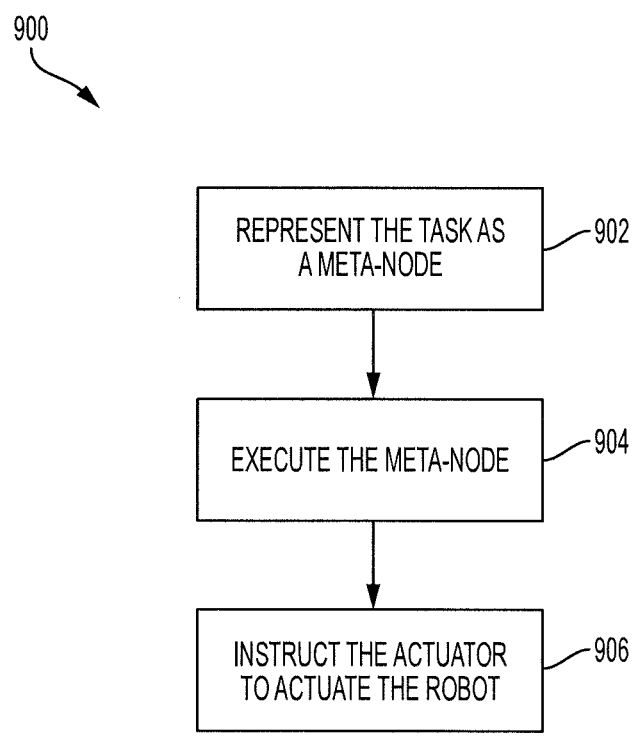
FIG. 9 illustrates a method for performing a task by a robot according to an embodiment of the present invention.

FIG. 9 illustrates a method 800 for accomplishing a task by a robot. In block 902, the processor represents the task as a meta-node. The meta-node may be defined by the processor of the robot or by a user of the robot.

In block 904, the meta-node is executed by the processor in order to simulate a trajectory for the task. The execution, as described above, can be an execution of the entire meta-node at once, all of the sub-nodes at once or an execution of the sub-nodes at different times. Additionally, the meta-node and/or sub-nodes may be executed multiple times in order to achieve a trajectory or trajectories that, when performed by the robot, will result in the task being accomplished.

In block 906, the processor instructs an actuator or actuators of the robot to actuate the robot. The processor instructs the actuators based on the results of the simulation. The processor causes the actuators to actuate so that the robot mimics the successful trajectory found in block 904.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A robot configured to accomplish a task in an environment, the robot comprising:
   at least one actuator or motor configured to actuate a portion of the robot; and
   a processor coupled to the at least one actuator or motor and configured to:
      represent the task as a meta-node having a meta start space representing starting configurations of the robot and the environment and a meta end space representing ending configurations of the robot and the environment after the task is completed, the meta-node being at least one of:
         a parallel meta-node including a first sub-node and a second sub-node each having a parallel start space within the meta start space and a parallel end space within the meta end space such that the meta end space is reached by successful execution of at least one of the first sub-node or the second sub-node, or
         a repetition meta-node including a third sub-node having a repetition start space within the meta start space and a repetition end space outside of the meta end space such that the meta end space is reached by multiple executions of the third sub-node, perform a simulation of the task by executing the parallel meta-node or the repetition meta-node, and
instruct the at least one actuator or motor to actuate the portion of the robot based on the simulation.

2. The robot of claim 1 wherein the task is a sub-task with respect to a meta-task represented by a second meta-node such that the meta-node is a sub-node with respect to the second meta-node.

3. The robot of claim 1 wherein each of the parallel start spaces represent starting configurations of the robot and the environment and each of the parallel end spaces represent ending configurations of the robot and the environment after the task is completed.

4. The robot of claim 1 wherein the repetition start space represents starting configurations of the robot and the environment and the repetition end space represents ending configurations of the robot and the environment that are closer to the meta end space than the repetition start space.

5. The robot of claim 1 wherein at least one of the first sub-node, the second sub-node or the third sub-node represents another meta-node with respect to at least one sub-sub-node of the meta-node.

6. The robot of claim 1 wherein the processor is further configured to represent the task as a sequence meta-node having the meta start space, the meta stop space, a fourth sub-node having a first sequence start space in the meta start space and a first sequence stop space and a fifth sub-node having a second sequence start space in the first sequence stop space of the fourth sub-node and a second sequence stop space in the meta stop space.

7. The robot of claim 6 wherein in order to perform the simulation using the sequence meta-node, the processor is configured to:
select a start point in the first sequence start space,
execute a function of the fourth sub-node using the start point as an input, and
determine whether the execution of the function results in an intermediate end point within the first sequence stop space.

8. The robot of claim 7 wherein the processor is further configured to:
execute a function of the fifth sub-node using the intermediate end point as an input in response to determining that the intermediate end point is within the first sequence stop space, and
determine whether the execution of the function of the fifth sub-node results in a meta end point within the meta stop space.

9. The robot of claim 1 wherein the meta-node is the parallel meta-node and in order to perform the simulation, the processor is configured to:
select a start point in the parallel start space of at least one of the first sub-node or the second sub-node,
execute a function of the at least one of the first sub-node or the second sub-node using the start point as an input, and
determine whether the execution of the function results in an end point within the meta end space.

10. The robot of claim 9 wherein the processor is further configured to:
select a new start point in the parallel start space of at least one of the first sub-node or the second sub-node in response to determining that the end point is not within the meta end space,
execute a function of the at least one of the first sub-node or the second sub-node using the new start point as an input, and
determine whether the execution of the function results in a second end point within the meta end space.

11. The robot of claim 1 wherein the meta-node is the repetition meta-node and in order to perform the simulation, the processor is configured to:
select a start point in the repetition start space,
execute a function of the third sub-node using the start point as an input,
determine whether the execution of the function results in a first end point within the meta end space,
execute the function of the third sub-node using the first end point as an input in response to determining that the first end point is not within the meta end space, and
determine whether the function of the third sub-node results in a second end point within the meta end space.

12. A method for controlling a robot in an environment comprising:
representing, by a processor, a task as a meta-node having a meta start space representing starting configurations of the robot and the environment and a meta end space representing ending configurations of the robot and the environment after the task is completed, the meta-node being at least one of:
a parallel meta-node including a first sub-node and a second sub-node each having a parallel start space within the meta start space and a parallel end space within the meta end space such that the meta end space is reached by successful execution of at least one of the first sub-node or the second sub-node,
a repetition meta-node including a third sub-node having a repetition start space within the meta start space and a repetition end space outside of the meta end space such that the meta end space is reached by multiple executions of the third sub-node, or
a sequence meta-node including a fourth sub-node having a first sequence start space in the meta start space and a first sequence stop space and a fifth sub-node having a second sequence start space in the first sequence stop space of the fourth sub-node and a second sequence stop space in the meta stop space;
performing, by the processor, a simulation of the task by executing the parallel meta-node, the repetition meta-node or the sequence meta-node; and
instructing, by the processor, the at least one actuator or motor to actuate at least a portion of the robot based on the simulation.

13. The method of claim 12 wherein the task is a sub-task with respect to a meta-task represented by a second meta-node such that the meta-node is a sub-node with respect to the second meta-node.

14. The method of claim 12 wherein each of the parallel start spaces represent starting configurations of the robot and the environment and each of the parallel end spaces represent ending configurations of the robot and the environment after the task is completed.

15. The method of claim 12 wherein the repetition start space represents starting configurations of the robot and the environment and the repetition end space represents ending configurations of the robot and the environment that are closer to the meta end space than the repetition start space.

16. The method of claim 12 wherein the first sequence start space represents starting configurations of the robot and the environment, the first sequence stop space represents ending configurations of the robot and the environment that may result from an execution of the fourth sub-node using points in the first sequence start space and that may be used by the fifth sub-node as starting configurations of the robot and the environment and the second sequence stop space represents ending configurations of the robot and the environment after the task is completed.

17. The method of claim 12 wherein at least one of the first sub-node, the second sub-node, the third sub-node, the fourth sub-node or the fifth sub-node represents a middle meta-node with respect to at least one sub-sub-node of the meta-node.

18. A method for controlling a robot in an environment comprising:
   receiving, at a processor, a definition of a meta-node representing a task and having a meta start space representing starting configurations of the robot and the environment and a meta end space representing ending configurations of the robot and the environment after the task is completed, the meta-node being at least one of:
      a parallel meta-node including a first sub-node and a second sub-node each having a parallel start space within the meta start space and a parallel end space within the meta end space such that the meta end space is reached by successful execution of at least one of the first sub-node or the second sub-node, or
      a repetition meta-node including a third sub-node having a repetition start space within the meta start space and a repetition end space outside of the meta end space such that the meta end space is reached by multiple executions of the third sub-node;
   performing, by the processor, a simulation of the task by executing the parallel meta-node or the repetition meta-node; and
   instructing, by the processor, the at least one actuator or motor to actuate at least a portion of the robot based on the simulation.

19. The method of claim 18 wherein in order to perform the simulation using the parallel meta-node includes:
   selecting, by the processor, a start point in the parallel start space of at least one of the first sub-node or the second sub-node,
   executing, by the processor, a function of the at least one of the first sub-node or the second sub-node using the start point as an input, and
   determining, by the processor, whether the execution of the function results in an end point within the meta end space.

20. The method of claim 18 wherein in order to perform the simulation using the repetition meta-node includes:
   selecting, by the processor, a start point in the repetition start space;
   executing, by the processor, a function of the third sub-node using the start point as an input;
   determining, by the processor, whether the execution of the function results in a first end point within the meta end space;
   executing, by the processor, the function of the third sub-node using the first end point as an input in response to determining that the first end point is not within the meta end space; and
   determining, by the processor, whether the function of the third sub-node results in a second end point within the meta end space.

* * * * *